United States Patent [19]

Hirai et al.

[11] 4,005,796
[45] Feb. 1, 1977

[54] MASTER CYLINDERS FOR HYDRAULIC AUTOMOTIVE BRAKE SYSTEMS

[75] Inventors: Akiyoshi Hirai; Hiroshi Uemura, both of Toyoda, Japan

[73] Assignee: Toyota Jidosha Kogyo Kabushiki Kaisha, Japan

[22] Filed: Jan. 24, 1975

[21] Appl. No.: 543,775

[30] Foreign Application Priority Data

Feb. 14, 1974 Japan .................. 49-17793

[52] U.S. Cl. .................. 220/85 R; 60/562; 220/288; 285/206
[51] Int. Cl.² .................. B65D 25/00; F16L 5/00
[58] Field of Search .......... 285/206, 161, 200, 205, 285/207, 208; 60/562; 220/85 R, 85 P, 288, 75, 71, DIG. 4

[56] References Cited

UNITED STATES PATENTS

| | | | |
|---|---|---|---|
| 170,019 | 11/1875 | Rowell | 285/205 |
| 501,715 | 7/1893 | Hardwick | 285/200 |
| 2,069,937 | 2/1937 | Black | 220/288 |
| 2,336,552 | 12/1943 | Langford | 285/200 |
| 2,409,907 | 10/1946 | Shakesby et al. | 220/DIG. 4 |
| 2,449,229 | 9/1948 | Hopwood | 285/200 |
| 2,482,469 | 9/1949 | Crowley | 285/200 |
| 2,730,381 | 1/1956 | Curtiss | 285/161 |
| 2,779,061 | 1/1957 | Hosking | 285/200 |
| 2,916,311 | 12/1959 | Keplinger | 220/288 |
| 3,195,932 | 7/1965 | Morton | 220/DIG. 4 |
| 3,232,628 | 2/1966 | Brand | 60/562 |
| 3,357,183 | 12/1967 | Krieger | 60/562 |
| 3,545,206 | 12/1970 | Belart | 60/562 |
| 3,558,067 | 1/1971 | Jenness | 220/71 |
| 3,698,190 | 10/1972 | Miyai | 60/562 |

*Primary Examiner*—William Price
*Assistant Examiner*—Allan N. Shoap
*Attorney, Agent, or Firm*—Stevens, Davis, Miller & Mosher

[57] ABSTRACT

An improved master cylinder for a hydraulic automotive brake system, comprising a metallic cylinder, a brake fluid reservoir made of plastic material, disposed in a perpendicular relation to the cylinder and having a circular opening at its bottom, a tubular extension formed on the cylinder at right angles thereto and extending between the cylinder and the brake fluid reservoir and having an axial bore which is coaxial with the bottom opening of the reservoir, a generally disc- or bowl-shaped connecting member made of metal, united with the reservoir in a one-step molding operation in such a manner as to substantially close the bottom opening of the reservoir and having a circular hole which is coaxial with the axial bore of the tubular extension, whereby the tubular extension of the cylinder is connected with the brake fluid reservoir in a fluid-tight manner, and a bolt associated with the connecting member in a fluid-tight manner, extending downwardly into the tubular extension of the cylinder and having an axial bore which permits the flow of brake fluid between the reservoir and the cylinder.

7 Claims, 4 Drawing Figures

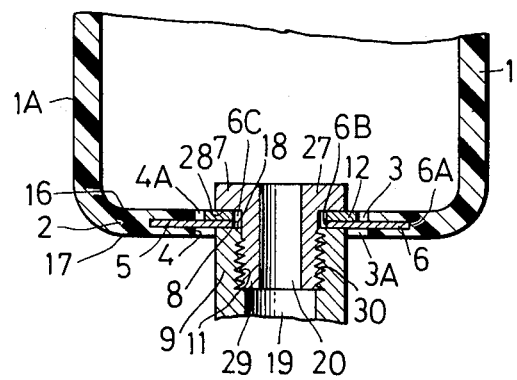
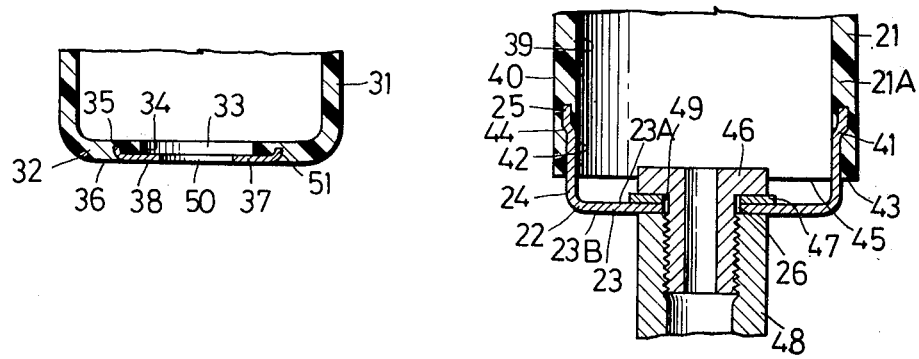

4,005,796

MASTER CYLINDERS FOR HYDRAULIC AUTOMOTIVE BRAKE SYSTEMS

BACKGROUND OF THE INVENTION

This invention relates to an improvement in the master cylinder for a hydraulic motor-vehicle brake system and more particularly, to an improved fluid-tight connection between the brake fluid reservoir and the cylinder of a master cylinder.

There is known a master cylinder for a hydraulic motor-vehicle brake system, essentially comprising a reservoir for brake fluid which is made of plastic material and a metallic cylinder connected to the brake fluid reservoir in a mutually communicative fashion. The reservoir has a circular opening in the bottom wall thereof and the cylinder includes a tubular extension having an internally threaded axial bore and vertically extending from the cylinder at right angles thereto to provide connection between the cylinder and the reservoir. The bottom opening of the reservoir and the tubular extension of the cylinder are vertically aligned with each other. The upper end of the tubular extension directly contacts the lower surface of the bottom wall of the reservoir along the lower peripheral edge of the opening therein. A bolt having an axial bore therethrough extends through the reservoir bottom opening and the cylinder tubular extension with a slight annular clearance left between the peripheral wall of the reservoir opening and the outer surface of the stem of the bolt. The lower face of the head of the bolt rests upon a washer, which in turn rests upon the upper peripheral edge of the reservoir bottom opening. The external thread provided on the stem of the bolt is engaged with the internal thread on the tubular extension of the cylinder to connect the reservoir and the cylinder. In the construction hereinabove described, however, the force applied to the bolt to tighten it is directly transmitted to the reservoir which is made of plastic material. Since plastic material can only withstand a relatively small compressive stress, it is usually impossible to tighten the bolt by applying a torque which is large enough to connect the reservoir with the cylinder in a satisfactorily fluid-tight manner. A further disadvantage of the device known in the art as hereinabove described is also due to its construction hereinabove described in which the bolt directly connects the reservoir and the cylinder. Because of the well-known tendency of plastic material to reduce its volume when heated, variation in the ambient temperature which frequently takes place on a motor-vehicle causes frequent dimensional changes in the plastic material of the reservoir. Since the bolt directly connects the reservoir to the cylinder, those frequent dimensional changes in the reservoir material in an area adjacent to the bolt very often loosens the bolt, and brake fluid flows out through the clearance formed between the bolt, the bottom wall of the reservoir and the upper end of the cylinder tubular extension upon loosening of the bolt.

SUMMARY OF THE INVENTION

It is an object of this invention to provide an improved master cylinder for a hydraulic motor-vehicle brake system which can maintain itself in a fluid-tight condition for a long period of time.

It is another object of this invention to provide an improved master cylinder for a hydraulic motor-vehicle brake system which is simple in construction and easy to manufacture and lends itself to mass production.

It is still another object of this invention to provide an improved means for connecting the brake fluid reservoir and the cylinder of a master cylinder for a hydraulic motor-vehicle brake system which is simple in construction, but can hold the reservoir and the cylinder together in a fluid-tight manner for a long period of time.

It is a further object of this invention to provide an improved means for connection between a brake fluid reservoir and a cylinder in a master cylinder for a hydraulic motor-vehicle brake system which can maintain the master cylinder in a proper working condition for a long period of time without being influenced by any variation in the ambient temperature.

It is a still further object of this invention to provide an improved means for connection between a brake fluid reservoir and a cylinder in a master cylinder for a hydraulic motor-vehicle brake system which can easily be united with the reservoir integrally therewith in a one-step molding operation and can withstand a strong force applied to a connecting bolt to tighten it to achieve a fluid-tight connection between the reservoir and the cylinder.

According to this invention, a connecting member made of metal and having a hole provided therethrough in the center thereof to receive a connecting bolt therein is secured in a fluid-tight manner to the bottom of a cylindrical brake fluid reservoir which is made of plastic material, for example, polyethylene. The bolt has an axial bore provided therethrough to allow brake fluid to flow down from the reservoir into a cylinder. The cylinder is formed with a tubular extension in a perpendicular relation thereto, in which the bolt is received to connect the reservoir and the cylinder in a mutually communicative fashion. The tubular extension of the cylinder has an upper end held against the connecting member in a fluid-tight manner, and the head of the bolt rests upon the connecting member with a washer interposed therebetween in a fluid-tight manner. Since there is no physical contact between the reservoir and the bolt, the force applied to the bolt to tighten it is not directly transmitted to the reservoir which is made of plastic material, but is only transmitted to the connecting member which is made of metal. Accordingly, it is possible to apply such a large torque to tighten the bolt as the plastic material of the reservoir cannot withstand, so that a really fluid-tight connection may be accomplished between the reservoir and the cylinder. Moreover, since the connecting member with which the bolt is directly associated is made of metal and is substantially free from any influence otherwise imposed by variation in the ambient temperature, the bolt remains tight enough to maintain a fluid-tight connection between the reservoir and the cylinder for a long period of time. According to a salient feature of this invention, the connecting member is united integrally with the reservoir in a one-step molding operation in which plastic material is molded over the connecting member.

Other objects and features of this invention will become apparent from the following detailed description and the accompanying drawings.

BRIEF DESCRIPTION OF THE DRAWINGS

FIG. 2 is a fragmentary enlarged view of the device shown in FIG. 1;

FIG. 3 is a fragmentary vertical sectional view of another embodiment of this invention; and FIG. 4 is a fragmentary vertical sectional view of still another embodiment of this invention.

DESCRIPTION OF THE PREFERRED EMBODIMENTS

Figure 1:
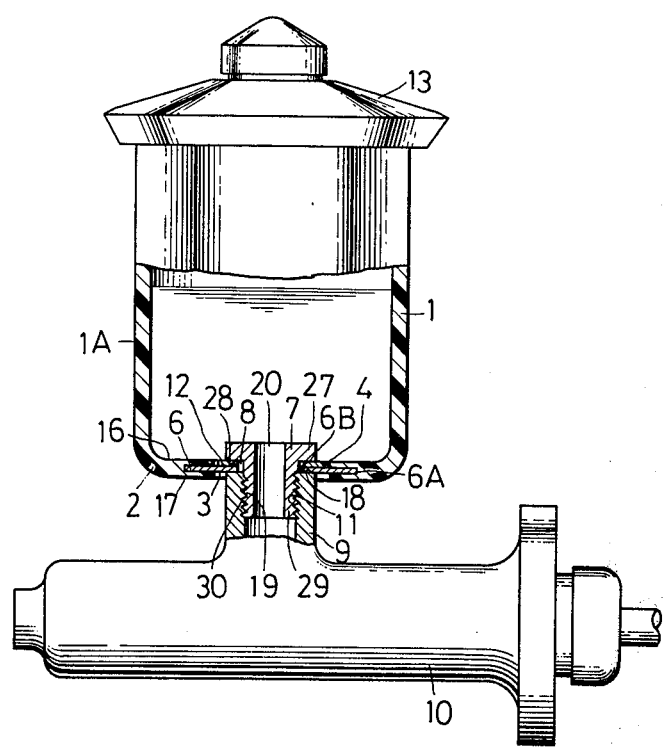
FIG. 1 is a front elevational view, partly in section, of one preferred embodiment of this invention.

Referring to FIGS. 1 and 2 of the drawings, the master cylinder according to a preferred embodiment of this invention comprises a cylindrical brake fluid reservoir 1 which is a molding product of plastic material, such as polyethylene, and a horizontally disposed metallic cylinder 10 positioned below the reservoir 1 at right angles thereto and connected therewith in a fluid-tight manner. The reservoir 1 includes a cylindrical side wall 1A and a circular bottom wall 2 which are an integral product of molding. The bottom wall 2 includes a circular hole 3 provided therethrough in the center thereof. The bottom wall 2 has an inner surface 16 and an outer surface 17 which are spaced apart from each other to define therebetween a cylindrical peripheral side wall 4 encircling the central hole 3. The peripheral side wall 4 of the central hole or opening 3 includes a relatively deep annular groove 5 which is coaxial with the central hole 3. The groove 5 is preferably equally spaced from the inner and outer surfaces 16 and 17 of the bottom wall 2. A disc-shaped, flat connecting member 6 is held by the bottom wall 2 and has an outer peripheral edge 6A engaged in the groove 5 in a fluid-tight manner. The outer peripheral edge 6A of the connecting member 6 is engaged in the groove 5 formed during the molding operation in which the plastic material of which the reservoir 1 is to be made is molded around the connecting member 6 suitably supported for one-step integral molding operation in a molding apparatus. The connecting member 6 is preferably made of a metal plate and has a circular hole 8 provided therethrough in the center thereof. The circular hole 8 is substantially coaxial with the hole 3 in the bottom wall 2 of the reservoir 1.

The cylinder 10 is disposed in a horizontal position and includes an upright tubular extension 9 extending upwardly therefrom in a mutually perpendicular relationship. The tubular extension 9 has an open upper end 18 and an axial bore 19 which is coaxial with the central hole 8 of the connecting member 6. The axial bore 19 has a somewhat smaller diameter than the hole 8. The tubular extension 9 is internally threaded as indicated at 11 along at least a portion of its length. An annular washer 12 rests upon the inner peripheral edge 6B of the connecting member 6 in a fluid-tight manner. The washer 12 has an inner diameter which is equal to the diameter of the central hole 8 in the connecting member 6, while the outer diameter of the washer 12 is somewhat smaller than the diameter of the central hole 3 in the bottom wall 2 of the reservoir 1, so that some annular clearance 4A is provided between the washer 12 and the peripheral side wall 4 of the hole 3 as illustrated in FIG. 1. The tubular extension 9 of the cylinder 10 is smaller in inner diameter, but larger in outer diameter, than the central hole 8 of the connecting member 6. The outer peripheral edge of the upper end 18 of the tubular extension 9 contacts the lower surface of the connecting member 6 in a fluid-tight manner along the inner peripheral edge 6B thereof.

The tubular extension 9 is somewhat smaller in outer diameter than the diameter of the central hole 3 in the reservoir bottom wall 2, so that some annular clearance 3A is maintained between the outer periphery of the tubular extension 9 and the peripheral side wall 4 of the hole 3. A bolt 7 having an axial bore 20 extends through the washer 12 and the connecting member 6 into the axial bore 19 of the tubular extension 9. The bolt 7 includes an annular head 27 having a lower annular surface 28, and a hollow cylindrical stem 29 externally threaded as indicated at 30 and extending through the tubular extension 9. The lower surface 28 of the head 27 rests upon the washer 12 in a fluid-tight manner, and the stem 29 is secured in the tubular extension 9 by threaded engagement to hold the reservoir 1 and the cylinder 10 together in a fluid-tight manner. Since the axial bore 19 of the tubular extension 9 is somewhat smaller in diameter than the circular holes of the connecting member 6 and the washer 12, the inner peripheral edge of the upper end 18 of the tubular extension 9 projects inwardly to some extent from the edges of the holes in the connecting member 6 and the washer 12, so that an annular clearance 6C is defined between the inner peripheral edge 6B of the connecting member 6 and the outer periphery of the bolt stem 29 immediately below the bolt head 27. The bolt head 27 is generally equal in outer diameter to the tubular extension 9, so that there does not exist any direct contact between the reservoir bottom wall 2 and the bolt 7. The axial bore 20 of the bolt 7 defines a passage for brake fluid between the reservoir 1 and the cylinder 10. The top of the reservoir 1 is closed by a removable filler cap 13.

Another embodiment of this invention is shown fragmentarily in FIG. 3. The structure of FIG. 3 is generally similar to that shown in FIGS. 1 and 2 and described with reference thereto. Accordingly, FIG. 3 shows, and the relevant description as will hereinafter appear is directed to, only that portion of the structure which is different from that of FIGS. 1 and 2. The apparatus includes a vertically disposed cylindrical brake fluid reservoir 31 having a bottom wall 32. The bottom wall 32 has a circular opening or hole 33 in the center thereof. The bottom wall 32 has an annular upper or inner surface 35 and an annular lower or outer surface 36 which define therebetween a circular peripheral side wall 34 encircling the central hole 33. The reservoir 31 is a molded product made of plastic material, such as polyethylene. A generally disc-shaped connecting member 37 is secured to the bottom wall 32 of the reservoir 31 in such a fashion as to close the central hole 33 in a fluid-tight manner. The connecting member 37 is embedded in the bottom wall 32 of the reservoir 31 along its outer peripheral edge and has a circular hole 50 in the center thereof. The central hole 50 of the connecting member 37 is considerably smaller in diameter than the central hole 33 of the reservoir bottom wall 32, and is coaxial with the latter. The central hole 50 of the connecting member 37 defines an annular lower surface 38 which is flush with the lower surface 36 of the reservoir bottom wall 32. The outer peripheral edge of the connecting member 37 is bent upwardly to define a rim 51. The rim 51 is securely embedded in the bottom wall 32 of the reservoir 31 and the top of the rim 51 is spaced substantially below the upper surface 35 of the reservoir bottom wall 32. The inner peripheral edge of the connecting member 37, which defines the central hole 50, is spaced considerably below the upper surface 35 of the reservoir bottom wall 32 and projects inwardly to a considerable extent from the peripheral side wall 34 of the central hole 33 in the reservoir bottom wall 32. The connecting member 37 is preferably made of a metal plate and united with the reservoir bottom wall 32 in a one-step molding operation. The other features of the device fragmentarily shown in FIG. 3 are identical to those of the device shown in FIGS. 1 and 2 and will not be described again.

Referring now to FIG. 4, still another embodiment of this invention includes a cylindrical brake fluid reservoir 21 which is a molded product of plastic material, such as polyethylene. The reservoir 21 comprises a cylindrical side wall 21A having an inner surface 39 and an outer surface 40. The cylindrical side wall 21A terminates in a lower end 43 which defines a circular opening 45 at the bottom of the reservoir 21. The circular opening 45 has a diamter which is equal to the inner diameter of the cylindrical side wall 21A. A generally bowl-shaped connecting member 22 is secured to the reservoir 21 in such a fashion as to close the bottom opening 45 in a fluid-tight manner. The connecting member 22 includes a flat, circular bottom wall 23 and a cylindrical side wall 24. The bottom wall 23 of the connecting member 22 is provided in its center with a circular hole 26 which is considerably smaller in diameter than the bottom opening 45 of the reservoir side wall 21A. The cylindrical side wall 24 of the connecting member 22 has an inner diameter which is substantially equal to the diameter of the reservoir bottom opening 45, so that the side wall 24 has an inner surface 42 which is flush with the inner surface 39 of the reservoir 21. The outer surface 44 of the side wall 24 is spaced considerably inwardly from the outer surface 40 of the reservoir side wall 21A. The lower end portion of the side wall 24 of the connecting member 22 is exposed below the lower end 43 of the reservoir side wall 21A. The upper end portion of the side wall 24 is slightly bent upwardly and outwardly to define a rim 25 via an upwardly and outwardly inclined shoulder 41. The rim 25 has a slightly larger inner diameter than the remainder of the side wall 24 of the connecting member 22, and is totally embedded in the reservoir side wall 21A. The connecting member 22 is preferably made of a metal plate and is united with the lower end portion of the reservoir side wall 21A in a one-step molding operation. An annular washer 47 which has an inner diameter equal to the diameter of the central hole 26 in the bottom wall 23 of the connecting member 22 rests upon the upper or inner surface 23A of the bottom wall 23 in a coaxial fashion. An upright tubular extension 48 of a cylinder (not shown) contacts the lower or outer surface 23B of the bottom wall 23 of the connecting member 22 in a fluid-tight manner and in a coaxial relation with the holes in the washer 47 and the connecting member 22. A bolt 46 having an axial bore therethrough extends into the tubular extension 48 through the washer 47 and the connecting member 22. The lower face of the head of the bolt 46 rests upon the washer 47 in a fluid-tight manner and the stem of the bolt 46 is connected into the tubular extension 48. The outer diameter of the stem of the bolt 46 is somewhat smaller than the diameter of the hole in the washer 47 and the central hole 26 in the bottom wall 23 of the connecting member 22. Accordingly, a small annular clearance 49 is defined to encircle the stem of the bolt 46 in a position immediately below the head. The other features of the device shown fragmentarily in FIG. 4 are identical to those of the devices already described and no repeated description will be necessary.

While the invention has been described with reference to several embodiments thereof, it is to be understood that further variations or modifications will be easily made by those skilled in the art without departing from the scope of this invention which is defined by the appended claims.

What is claimed is:

1. In combination with a master cylinder for an hydraulic automotive brake system, wherein an horizontally disposed cylinder having an internally threaded upright tubular extension formed thereon and a vertically disposed cylindrical brake fluid reservoir made of plastic material, such as polyethylene, and positioned above said cylinder are connected with each other in a fluid-tight but mutually communicative manner by an axially bored bolt extending into said tubular extension through an annular washer associated with said bolt and a circular opening provided at the bottom of said reservoir; said reservoir comprising a cylindrical side wall terminating at its lower end in a bottom wall having an annular inner surface and an annular outer surface below said inner surface, said inner and outer surfaces encircling said circular opening;

the improvement which comprises:
a flat disc made of metal having an upper surface spaced below said inner surface of said bottom wall of said reservoir and a lower surface which is substantially flush with said outer surface of said bottom wall of said reservoir, said disc having an outer peripheral edge bent upward to define an upstanding rim terminating in a position considerably below said inner surface of said bottom wall of said reservoir, said disc having a central circular hole which is smaller in diameter than said circular opening of said reservoir, said circular hole of said disc being coaxial with said circular opening of said reservoir, said tubular extension, said bolt and said washer, said circular hole of said disc having a peripheral edge interposed between said tubular extension and said washer in a fluid tight manner, said bolt extending through said circular hole of said disc, the diameter of said circular hole being larger then the inner diameter of said tubular extension but smaller than the outer diameter thereof, the diameter of said circular opening of said reservoir being larger than the outer diameter of any of said tubular extension, said bolt and said washer.

2. In combination with a master cylinder for a hydraulic automotive brake system, wherein a horizontally disposed cylinder having an internally threaded upright tubular extension formed thereon and a vertically disposed cylindrical brake fluid reservoir made of plastic material, and positioned above said cylinder are connected with each other in a fluid-tight but mutually communicative manner by an axially bored belt extending into said tubular extension through an annular washer associated with said bolt and a circular opening provided at the bottom of said reservoir;

the improvement which comprises:
a metal connecting member having an outer peripheral edge secured to said bottom of said reservoir and an inner peripheral edge defining a circular hose having a diameter which is smaller than that of said circular opening of said reservoir, said circular hole of said connecting member being coaxial with said circular opening of said reservoir, said tubular extension, said bolt and said washer, said inner peripheral edge of said connecting member being interposed between said tubular extension and said washer in a fluid-tight manner, said bolt extending through said circular hole of said connecting member, said diameter of said circular hole being larger than the inner diameter of said tubular extension but smaller than the outer diameter thereof;

said diameter of said circular opening of said reservoir being larger than the outer diameter of any of said tubular extension, said bolt and said washer;

wherein said reservoir comprises a cylindrical side wall having a cylindrical inner surface defining an inner diameter which is equal to said diameter of said circular opening, and a cylindrical outer surface encircling said inner surface; and said connecting member comprises a bowl-shaped structure made of metal having a wall thickness which is smaller than the thickness of said cylindrical side wall of said reservoir, said outer peripheral edge of said connecting member being embedded in said cylindrical side wall of said reservoir at the lower end of said cylindrical side wall, said reservoir and said bowl-shaped structure being a product of an integral molding operation.

3. The combination as defined in claim 2 wherein said bowl-shaped structure comprises a cylindrical side wall terminating at its lower end in a circular bottom wall in which said circular hole of said connecting member is provided, said cylindrical side wall of said bowl-shaped structure having a cylindrical upper end defining said outer peripheral edge of said connecting member.

4. The combination as defined in claim 3 wherein said circular bottom wall of said bowl-shaped structure is spaced below said lower end of said cylindrical side wall of said reservoir with a portion of said cylindrical side wall of said bowl-shaped structure projecting below said lower end of said cylindrical side wall of said reservoir, while the remaining portion of said cylindrical side wall of said bowl-shaped structure is embedded in said cylindrical side wall of said reservoir.

5. The combination as defined in claim 4 wherein said remaining portion of said cylindrical side wall of said bowl-shaped structure has an axial length which is greater than that of said portion thereof projecting below said lower end of said cylindrical side wall of said reservoir.

6. The combination as defined in claim 3 wherein said cylindrical side wall of said bowl-shaped structure has a cylindrical inner surface which is flush with said cylindrical inner surface of said cylindrical side wall of said reservoir.

7. The combination as defined in claim 6 wherein said cylindrical side wall of said bowl-shaped structure includes an outwardly directed annular shoulder defining a cylindrical rim at said upper end of said cylindrical side wall of said bowl-shaped structure, said rim having an inner diameter which is larger than said inner diameter of said cylindrical side wall of said reservoir, and an outer diameter which is smaller than that of said cylindrical side wall of said reservoir.

* * * * *